(12) United States Patent
Sevenich et al.

(10) Patent No.: US 10,127,025 B2
(45) Date of Patent: Nov. 13, 2018

(54) OPTIMIZATION TECHNIQUES FOR HIGH-LEVEL GRAPH LANGUAGE COMPILERS

(71) Applicant: Oracle International Corporation, Redwood Shores, CA (US)

(72) Inventors: Martin Sevenich, Palo Alto, CA (US); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/805,897

(22) Filed: Jul. 22, 2015

(65) Prior Publication Data

US 2017/0024194 A1 Jan. 26, 2017

(51) Int. Cl.
*G06F 8/41* (2018.01)
(52) U.S. Cl.
CPC ............ *G06F 8/443* (2013.01); *G06F 8/4443* (2013.01)
(58) Field of Classification Search
CPC .............................. G06F 8/443; G06F 8/4443
See application file for complete search history.

(56) References Cited

U.S. PATENT DOCUMENTS

| | | | | |
|---|---|---|---|---|
| 5,805,863 A * | 9/1998 | Chang | ................. | G06F 11/3466 714/E11.2 |
| 5,822,587 A * | 10/1998 | McDonald | ............ | G06F 9/4428 717/108 |
| 6,883,161 B1 | 4/2005 | Chovin et al. | | |
| 6,922,830 B1 * | 7/2005 | Schmidt | ................ | G06F 8/4434 717/132 |
| 7,478,375 B1 | 1/2009 | Kersters | | |
| 8,037,108 B1 | 10/2011 | Chang | | |
| 8,910,134 B2 | 12/2014 | Hong et al. | | |
| 8,949,811 B2 | 2/2015 | Murthy | | |
| 2004/0128661 A1 * | 7/2004 | Ghosh | ................... | G06F 8/4442 717/159 |

(Continued)

OTHER PUBLICATIONS

Dolby, "Automatic Inline Allocation of Objects", Proceedings of the ACM SIGPLAN conference on Programming language design and implementation, Jun. 16-18, 1997, Las Vegas NV, vol. 32 Issue 5, pp. 7-17.*

(Continued)

*Primary Examiner* — S. Sough
*Assistant Examiner* — Timothy P Duncan
(74) *Attorney, Agent, or Firm* — Hickman Palermo Becker Bingham LLP (57) ABSTRACT

Techniques for optimizing program code through property merging are described. In an embodiment, a compiler identifies, from a plurality of properties of a particular data object that are referenced by the program code, one or more candidate sets of properties that are eligible for merging. For a respective candidate set of properties of the one or more candidate set of properties, the compiler determines whether to merge different properties of the particular data object that belong to the respective candidate set of properties. After determining to merge the different properties, a particular data structure is generated, within the memory of a computing device, that stores the different properties of the particular data object that belong to the respective candidate set.

20 Claims, 5 Drawing Sheets

(56) References Cited

U.S. PATENT DOCUMENTS

| | | | |
|---|---|---|---|
| 2004/0133747 A1* | 7/2004 | Coldewey | G06F 12/0862 711/137 |
| 2004/0194074 A1 | 9/2004 | Shibayama | |
| 2005/0278451 A1 | 12/2005 | Yamashita | |
| 2005/0289125 A1 | 12/2005 | Liu | |
| 2006/0195463 A1 | 8/2006 | Bogner | |
| 2007/0192306 A1 | 8/2007 | Papakonstantinou | |
| 2010/0023700 A1* | 1/2010 | Chen | G06F 8/4442 711/135 |
| 2010/0169758 A1 | 7/2010 | Thomsen | |
| 2011/0055511 A1 | 3/2011 | Mantor | |
| 2011/0055819 A1* | 3/2011 | Doyle | G06F 8/443 717/156 |
| 2011/0099541 A1 | 4/2011 | Blomstedt | |
| 2011/0138369 A1 | 6/2011 | Chandra | |
| 2011/0239197 A1* | 9/2011 | Dayan | G06F 9/445 717/128 |
| 2011/0276962 A1 | 11/2011 | Chambers | |
| 2013/0031536 A1* | 1/2013 | De | G06F 9/4552 717/146 |
| 2013/0097136 A1 | 4/2013 | Goldberg | |
| 2013/0139135 A1 | 5/2013 | Ditu | |
| 2014/0019949 A1 | 1/2014 | Craymer | |
| 2014/0122812 A1 | 5/2014 | Hakura | |
| 2014/0189665 A1 | 7/2014 | Hong et al. | |
| 2014/0282384 A1 | 9/2014 | Pamer | |
| 2014/0306964 A1 | 10/2014 | Reddish | |
| 2014/0310619 A1 | 10/2014 | Fickenwirth | |
| 2014/0325666 A1 | 10/2014 | Gkoulalas-Divanis | |
| 2014/0351820 A1 | 11/2014 | Lee | |
| 2015/0007154 A1 | 1/2015 | Bharadwaj | |
| 2015/0040110 A1 | 2/2015 | Adl-Tabatabai | |
| 2015/0052175 A1 | 2/2015 | Bornea | |
| 2015/0067639 A1* | 3/2015 | Pizlo | G06F 12/0815 717/108 |
| 2015/0095698 A1 | 4/2015 | Ema | |
| 2015/0128151 A1 | 5/2015 | Rak | |
| 2015/0178405 A1 | 6/2015 | Hong et al. | |
| 2015/0331683 A1 | 11/2015 | Sevenich et al. | |
| 2015/0350324 A1 | 12/2015 | Hu et al. | |
| 2015/0355891 A1 | 12/2015 | Angerer | |
| 2016/0019228 A1 | 1/2016 | Hong | |
| 2016/0026680 A1 | 1/2016 | Banerjee | |
| 2016/0048607 A1 | 2/2016 | Raman | |
| 2016/0062776 A1 | 3/2016 | Stanfill | |
| 2016/0117358 A1 | 4/2016 | Schmid | |
| 2016/0342628 A1 | 11/2016 | Rest | |
| 2016/0364220 A1 | 12/2016 | Arai | |
| 2017/0024192 A1 | 1/2017 | Hong et al. | |
| 2017/0168779 A1 | 6/2017 | Sevenich | |

OTHER PUBLICATIONS

McKinley et al., "Improving Data Locality with Loop Transformations", ACM Transactions on Programming Languages and Systems (TOPLAS), vol. 18 Issue 4, pp. 424-453 (Year: 1996).*

Sevenich et al., "Using Domain-Specific Languages for Analytic Grpah Database", VLDB Endowment, dated Sep. 2016, pp. 1257-1268.

Schiller et al., "Efficient Data Structures for Dynamic Graph Analysis", IEEE, dated Nov. 2015, pp. 497-504.

Hong et al. "Green-Marl: A DSL for East and Efficient Grpah Analysis", ACM, ASPLOS, dated Mar. 2012, pp. 349-362.

Perez et al., "Ringo: Interactive Graph Analytics on Big-Memory Machines", ACM, SIGMOD, dated May 2015, 6 pages.

Banerjee et al., "Towards Logical Level Design of Big Data", dated Jul. 2015, 7 pages.

Bak et al., "A Reference Interpreter for the Graph Programming Language GP 2", Proc. Graphs as Models (GaM 2015), vol. 181, dated Apr. 2015, 17 pages.

U.S. Appl. No. 14/805,882, filed Jul. 22, 2015, Notice of Allowance, dated May 19, 2016.

U.S. Appl. No. 14/805,882, filed Jul. 22, 2015, Notice of Allowance, dated Sep. 28, 2016.

U.S. Appl. No. 14/805,882, filed Jul. 22, 2015, Office Action, dated Feb. 4, 2016.

Hong et al., "Simplifying Scalable Graph Processing with a Domain-Specific Language", ADM, CGO'14, pp. 208-218.

Hong et al., "Green-Marl: A DSL for Easy and Efficient Graph Analysis", dated 2012 ACM, ASPLOS'12, pp. 349-362.

Hong et al., "Early Experiences in Using a Domain-Specific Language for Large-Scale Graph Analysis", ACM, Grades, dated 2013, pp. 1-6.

Rest, U.S. Appl. No. 14/718,411, filed May 21, 2015, Office Action, dated Jul. 12, 2017.

Rest, U.S. Appl. No. 14/718,411, filed May 21, 2015, Interview Summary, dated Sep. 29, 2017.

Sevenich, U.S. Appl. No. 14/969,231, filed Dec. 15, 2015, Office Action, dated Sep. 8, 2017.

Sparsity Technologies, "Sparksee User Manual", API, http://www.sparsity-technologies.com/UserManual/API.html, 61 pages, dated 2015.

Freeman, Eve, "Getting Started with Neo4j and Cypher", https://www.airpair.com/neo4j/posts/getting-started-with-neo4j-and-cypher, dated Oct. 2016, 12 pages.

Flores et al, "Semantic Data Management in Graph Databases", Tutorial at ESWC 2014—, dated 2014, 153 pages.

Sevenich, U.S. Appl. No. 14/969,231, filed Dec. 15, 2015, Notice of Allowance, dated Jan. 11, 2018.

Rest, U.S. Appl. No. 14/718,411, filed May 21, 2015, Final Office Action, dated Jan. 17, 2018.

Moran, Brian, "Adding Columns to Large MySQL Tables Quickly", https://www.onehub.com/blog/2009/09/15/adding-columns-to-large-mysql-tables-quickly/, dated Sep. 15, 2009, 7 pages.

* cited by examiner

OPTIMIZATION TECHNIQUES FOR HIGH-LEVEL GRAPH LANGUAGE COMPILERS

CROSS-REFERENCE TO RELATED APPLICATIONS

This application is related to U.S. Pat. No. 9,575,736 B2, filed Jul. 22, 2015, entitled "AN ADVANCED INTERACTIVE COMMAND-LINE FRONT-END FOR GRAPH ANALYSIS SYSTEMS", the entire contents of which is hereby incorporated by reference as if fully set forth herein.

FIELD OF THE DISCLOSURE

The present disclosure relates, generally, to compiler optimizations and, more specifically, to techniques for identifying different properties of an object referenced by program code and merging the different properties into a specialized data structure to improve utilization of memory bandwidth on a computer executing the program code.

BACKGROUND

Graph analysis is a subfield of data analysis that encompasses systems and methods for analyzing datasets modelled as graphs. A graph in this context represents an underlying dataset that it is organized into a set of data entities and connections. The data entities are referred to as nodes or vertices of the graph, and the connections between data entities are referred to as edges of the graph. Other information in the underlying dataset may be encoded as node or edge properties. Using this model, a graph may capture fine-grained, arbitrary relationships between different data entities within the underlying dataset. Graphs can be used to model a wide variety of systems and relationships including, without limitation, communication networks, linguistic structures, social networks, data hierarchies, and other physical or virtual systems. For instance, a node within a graph may represent a person in the underlying dataset with node properties representing social security number, name, address, etc. The edges may represent connections between people, with edge properties capturing the strength of connection, a source of the connection etc. Other entities and connections may also be represented depending on the particular application. By analyzing relationships captured by a graph, data scientists, applications, or other users can obtain valuable insights about the original dataset.

Computer-implemented processes for performing graph analysis are generally not computation-intensive but may be significantly memory-bound. For example, some operations may be performed by traversing nodes of a graph and performing simple comparisons. Although the processing overhead for these operations may be relatively small, some datasets have a large number of nodes to analyze. In such scenarios, memory can become a chokepoint, slowing down the performance of such graph analysis operations.

Graph processing systems may use different approaches for structuring node and edge properties (collectively referred to herein as "graph properties"). According to one such approach, graph properties are stored in a row-oriented format, where different rows correspond to different nodes or edges, and the attributes for each row represent different graph properties. Within memory, the graph properties that belong to a node or edge are stored contiguously. TABLE 1 below illustrates an example data structure that organizes node properties according to a row-oriented format.

TABLE 1

SAMPLE NODE PROPERTIES IN ROW-ORIENTED FORMAT

```
struct node_property {
    long employer_id
    string name
    string address
    int base_salary
    ...
}
```

Referring to TABLE 1, the node properties including "employer_id", "name", "address", and "salary" are stored contiguously in memory for a node. These memory entries may be followed by the node properties for a next node in the graph.

According to another approach, graph properties are stored in a column-oriented format. In this approach, a set of property vectors are defined, where each property vector contiguously stores values spanning multiple nodes or edges for a respective graph property. TABLE 2 below illustrates an example data structure that organizes node properties in column-oriented format.

TABLE 2

SAMPLE NODE PROPERTIES IN COLUMN-ORIENTED FORMAT

```
std::vector <long> node_prop_employer_id
std::vector <string> node_prop_name
std::vector <string> node_prop_address
std::vector <int> base_salary
...
```

Referring to TABLE 2, the property vector "node_prop_employed_id" stores a set of employer_id values from different nodes contiguously in memory. Similarly, the property vectors "node_prop name", "node_prop address", and "base_salary" store contiguous values for the corresponding node properties.

According to another approach, node properties are structured using a key-value store. In this approach, properties are represented as a general key-value map for each node or edge. TABLE 3 below illustrates an example data structure that organizes node properties using a key-value mapping.

TABLE 3

SAMPLE KEY-VALUE MAPPING FOR NODE PROPERTIES

```
struct node_props {
    std:map < string, void*> property_map;
}
...
```

Referring to TABLE 3, key-value pairings for the node are arbitrarily defined according to "property_map". The key-value pairings map a property, which acts as the key, to a corresponding property value. The key-value pairings may be stored contiguously in memory.

The approaches described above involve various tradeoffs when applied to graph analysis procedures. If only a single node property is involved in a particular procedure, then the column-oriented approach allows different values of the property to be read from consecutive memory locations. In such scenarios, the column-oriented approach may yield significant improvements in memory bandwidth over the row-oriented and key-value approaches. On the other hand, the row-oriented approach may improve memory access times if a particular procedure accesses all of the properties of a row. The key-value approach allows for greater flexibility in defining the properties of a node or edge, but may suffer in memory performance due to the lack of structure.

For certain graph analysis procedures, none of the approaches described above yield significant improvements with respect to memory performance. Generally, this scenario occurs when the graph analysis procedure accesses only a subset of the properties that belong to a graph object, and the accesses occur multiple times in a non-sequential manner. TABLE 4 below depicts an example algorithm where multiple, non-sequential property accesses occur.

TABLE 4

SAMPLE ALGORITHM WITH MULTIPLE ACCESSES
OF DIFFERENT NODE PROPERTIES

```
...
while (some_condition) {
    foreach(n: G.nodes)
        foreach(t: n.Nbrs)
            n.foo = t.bar1 + t.bar2;
    ...
}
...
```

In the example depicted in TABLE 4, the properties are located in different memory locations. Therefore, accessing the values of two properties (even for the same node) results in two reads to two non-consecutive memory addresses. Even with row-oriented approach, there is no guarantee that the two properties, "bar1" and "bar2", are consecutive in-memory or located in the same cache line. Consequently, a central processing unit executing the above algorithm may require reads of two separate cache lines to access "bar1" and "bar2". Multiple reads contributes to memory bottleneck, especially when the expression is executed repeatedly across different nodes or edges.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for merging different properties of an object. According to various embodiments, property merging comprises identifying, in an algorithm embodied in program code, a set of properties that are likely to be accessed at the same time. At the beginning of the algorithm, a merged property data structure is generated to hold the identified properties in consecutive memory locations. The original property values are then copied into the merged property data structure. During execution of the algorithm, the merged property data structure is used instead of the original properties. At the end of algorithm execution, the values in the merged property data structure are copied back into the original properties, if modified.

For some algorithms, property merging may improve memory performance within computer systems on which the algorithm is executing. When values of several properties are used together in the same expression, the properties may be merged into a single data structure such that the properties referenced by the expression are stored in consecutive memory locations to optimize the memory layout for expression evaluation. Properties of the object that are not used in the expression may be omitted from the merged property data structure. In the example procedure depicted in TABLE 4, for instance, the two node properties "bar1" and "bar2" may be merged into a merged property data structure that stores the corresponding property values consecutively in memory. Because many central processing units (CPUs) use cache lines as units of memory access, multiple properties that reside in the same cache line may be freely transferred with a single load instruction.

The techniques described herein may be automatically applied to program code through a high-level compiler or other application program. In some embodiments, a compiler statically analyzes program code to find candidate sets of properties of a graph or other data object that are eligible for merging. For each respective candidate set of properties, the compiler determines whether to merge different properties that belong to the respective candidate set of properties. Some instances of properties of the data object may not yield significant benefits through merging, or there may be conflicts between merging different candidate sets of properties when the properties overlap multiple sets. The compiler may employ a heuristic approach to identify and determine which candidate sets of properties to merge. For each respective candidate set of properties that is selected for property merging, the compiler modifies the program code such that a merged property data structure is generated within memory of a computing device and accessed during program execution. The compiler optimizations and code modifications may happen transparently with little or no user intervention.

Exposing Semantic Information Through Domain-Specific Languages

Embodiments described herein are applicable to optimize the memory layout of graph properties referenced by graph analysis procedures. A graph property in this context represents an element of a graph data object and may include both node properties and edge properties. A "node property" as used herein refers to a property of a graph node, and an "edge property" as used herein refers to a property of a graph edge. Each graph property may be associated with a name and a set of one or more values. As an example, a graph node may represent a person, corporation, or other entity. Each graph property may correspond to a different characteristic of the corresponding person, corporation, and other entity. As previously indicated, a person node may be associated with characteristics corresponding to the person's name, social security number, etc. The properties and organization of the graph may vary depending on the particular implementation.

A graph analysis procedure or algorithm refers to logic that operates on one or more graph data objects, such as nodes, edges, or the graphs themselves, to produce an analytical output. The logic within a graph analysis procedure may be arbitrary and custom defined by a user to perform graph analysis based on the demands of a particular application. As an example a user may define a set of filters for retrieving a set of graph nodes or apply some custom formula that defines an output as function of one or more graph property values. The output of the procedure may be a set of nodes, property values, visual display, or some other data item or set of data items.

In some embodiments, the graph analysis procedures to which property merging is applied are written in a domain-specific language (DSL) that is specialized for graph analysis. A DSL in the context of graph analysis allows a user to intuitively define graph objects and properties using specialized semantics and exposes such high-level semantics of graph operations to a compiler, allowing for greater parallelization and other compiler optimizations. An example of such a DSL for graph analysis is Green-Marl, although other DSLs that expose similar semantics of graph operations may also be used, depending on the particular implementation. DSL compilers may leverage the specialized semantic information to apply property merging techniques described further herein. For example, DSL compilers may leverage graph specific semantics and knowledge about a target language and platform to automatically generate code that merges multiple properties into a single property. The DSL compiler may further integrate the property merging techniques with other optimizations and parallelization provided through the high-level semantic information provided through the DSL.

Embodiments described herein are also applicable to optimize the layout of properties of data objects in contexts other than graph analysis. Custom procedures may be defined to analyze a variety of different data objects. As an example, some high-level, such as the R programming language, are specifically tailored to perform statistical analyses on custom-defined objects as defined through object-oriented programming code. An R compiler or other high-level language compiler may apply the property merging techniques to data analysis procedures where multiple properties of a data object are accessed in a non-sequential manner.

Figure 1:
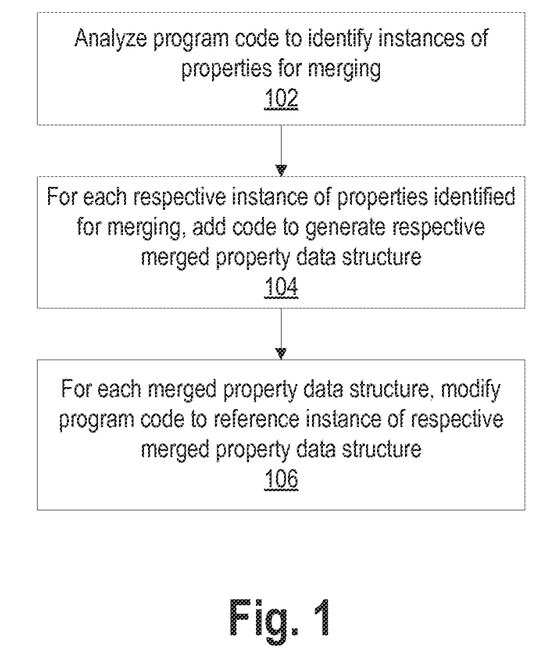
FIG. 1 depicts an example process for merging multiple properties of a data object into a merged property data structure.

FIG. 1 depicts an example process for merging multiple properties of a data object into a merged property data structure, according to an embodiment. In step 102, a compiler or other application program analyzes program code to identify instances of properties for merging. In the context of graph analysis procedures, for example, a DSL compiler may quickly identify instances of node properties in the program code based on the semantic information of the DSL. The DSL compiler may then repeat the process to identify instances of edge properties included in the same program code. In some embodiments, the DSL compiler may heuristically select instances of properties of merging based on patterns within the code and a set of filter criteria. The heuristic and filter criteria used to select properties for merging may vary from implementation to implementation.

In step 104, a respective merged property data structure is generated for each set of identified property instances. In order to generate the merged property data structure, a compiler or other application may add program code which, when executed, merges the properties into a single data structure such that the properties are stored consecutively within memory. In the context of graph analysis, for example, the DSL compiler may create a separate data structure for each instance of node properties and/or edge properties that is selected for merging. Depending on the use of the properties in the program code, the compiler may add code for initializing the merged property data structure at this step.

In step 106, the compiler or other application program modifies the program code to reference an instance of the respective merged property data structure for each merged property data structure. During this step the compiler or other application may analyze the program code to identify and replace reads and writes to original properties with reads and writes to the merged property data structure where the original properties were merged. The compiler may further modify the code by removing instances of unused properties from the program code and/or adding code to write values back from the merged property data structure to the original property. The order in which the modifications are applied may vary depending on the particular implementation.

Examples for each of the steps depicted in FIG. 1 are given in further detail in the sections below. While the examples below are described in the context of node and edge properties of a graph, the process is also applicable to properties of other data objects as previously indicated.

Identifying and Selecting Candidate Sets of Properties for Merging

In some embodiments, a compiler may perform step 102 by analyzing an input program to search for instances of node and/or edge properties. Instances of a node property include variables and program arguments that are of a node property type. Instances of an edge property include variables and program arguments that are of an edge property type. A "type" or "data type" in this context refers to a classification of data in a type system, which indicates to a compiler the meaning of the data and the manner in which values for the data may be stored.

In some embodiments, the compiler may not perform property merging for all instances of graph properties that are identified in program code. As previously indicated, the property merging may not yield significant performance benefits and may not be worth the cost, depending on the particular application and program code. To determine which properties to merge, the compiler may employ a heuristic approach and/or one or more filter criteria. According to the heuristic approach, the compiler identifies candidate sets of properties that are eligible for merging. A "candidate set of properties" in this context refers to two or more properties of a data object that are candidates to be merged into a single merged property data structure. Eligibility may be determined based on criteria such as whether the properties are referenced by the same expression, whether the objects belong to the same data object, the frequency or likely frequency with which the properties are accessed concurrently (or substantially concurrently) and/or other similar factors.

Figure 2:
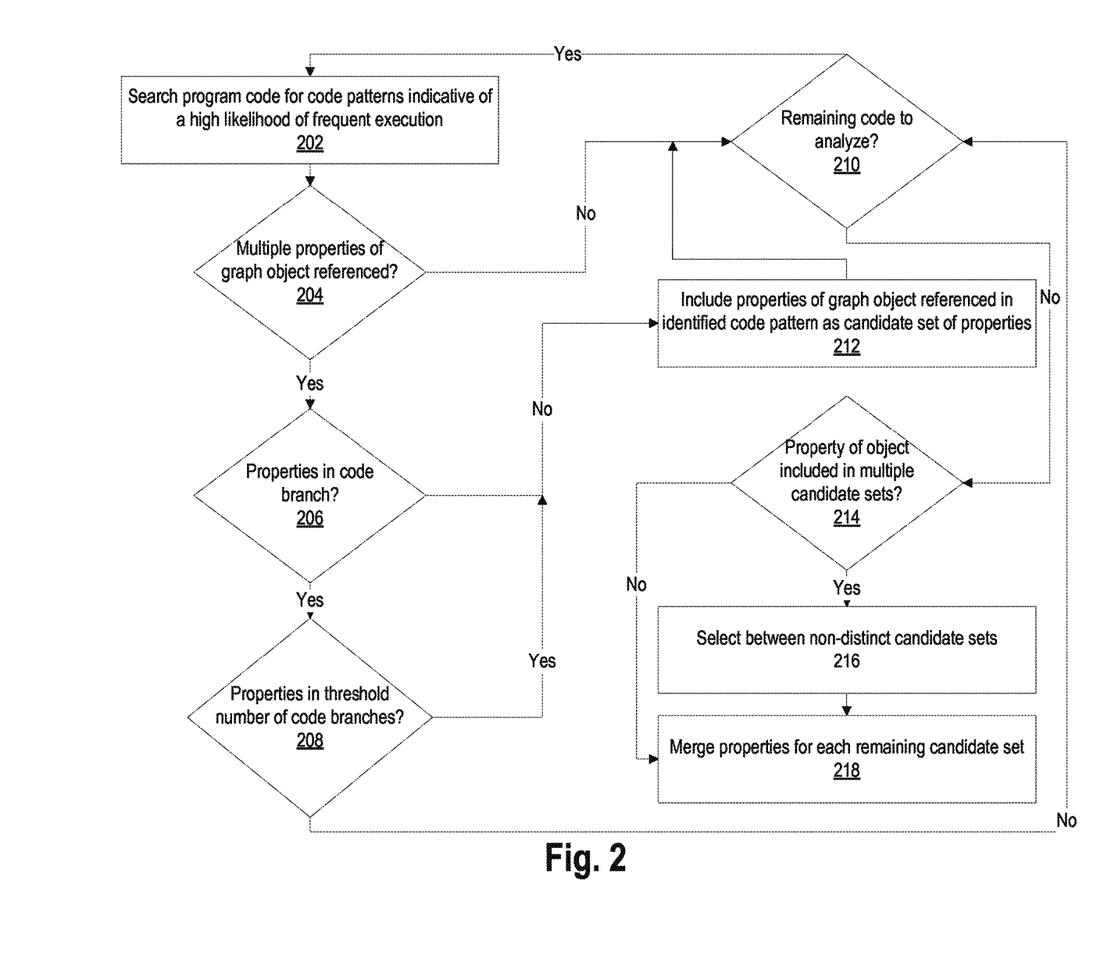
FIG. 2 depicts an example process for identifying and selecting candidate set of properties for merging.

FIG. 2 depicts an example process for identifying and selecting candidate set of properties for merging, according to an embodiment. In step 202, a compiler searches program code of an input program for code patterns that are indicative of a high likelihood of frequent execution. Examples of such code patterns may include nested loops such as depicted in TABLE 5 below.

TABLE 5

SAMPLE NESTED LOOPS

| | |
|---|---|
| ... | ... |
| foreach(v: G.nodes) { | while(i < MAX) { |
|   foreach(n: v.nbrs) { |   foreach(n: G.nodes) { |
|     <CODE> |     <CODE> |
|   } |   } |
| } | } |
| ... | ... |

TABLE 5 depicts two examples of nested loops: one in which a foreach loop is nested inside another foreach loop and another where a foreach loop is nested inside a while loop. The loops iterate over different nodes of a graph, and the expressions included in the nested loops are likely to be executed often during program execution. The compiler may search for such code patterns and/or other patterns where the code is likely to be executed frequently. For instance, the compiler may search for patterns that will be executed $O(a*N)$ times, where "a" represents a scaling factor larger than one and "N" represents the number of nodes in the graph. The patterns that are identified by the compiler at this step may vary from implementation to implementation.

In step 204, the compiler determines whether the identified code patterns includes a nested expression that reference multiple properties of a graph object. The expressions may be varied depending on the logic of the particular program code being analyzed. TABLE 6 below depicts two examples of such expressions.

TABLE 6

SAMPLE NESTED EXPRESSIONS

| | |
|---|---|
| n.A + n.B | (n.A + 1) / (2 * n.B) |

The expressions of TABLE 6 both use the node properties "A" and "B". Other expressions may reference more than two properties and/or may use the properties in different ways, such as to perform different computations or comparisons. If the expression does not reference multiple properties of a graph object, then the process continues to step 210. Otherwise the process continues to step 206.

In step 206, the compiler determines whether the expression that references the properties is located in a conditional code branch. For instance, the compiler may parse the code to search for conditional statements or other indications of conditional branching. TABLE 7 below depicts example expressions that are located in code branches.

TABLE 7

SAMPLE CODE BRANCHES WITH ELIGIBLE EXPRESSIONS

| | |
|---|---|
| if( ... ) { | //both expressions will be |
| //expression will not be | //considered by the compiler |
| //considered by the compiler | if( ... ) { |
|   x = n.A + n.B; |   x = n.A + n.B; |
| } | } else { |
| |   x = n.A * (2 * n.B); |
| | } |

In the first example depicted in TABLE 7, the expression "x=n·A+n·B" references two node properties and is included in a single code branch per the "if" statement. In the second example, the same node properties are referenced by a second expression "x=n·A*(2*n·B)", which is located in a second branch per the "else" statement. In both cases, the process may continue to step 208 since both expressions are included in conditional code branches. If the properties of an expression are not included in a conditional code branch, then the process continues to step 212.

In step 208, the compiler determines whether the expression is in a threshold number of code branches that stem from the conditional statement. The threshold may vary from implementation to implementation. If the threshold is two code branches, for instance, then the compiler disregards expressions that are only in one branch of code, such as the first expression depicted in TABLE 7, and the process continues to step 210. When both branches of the code path include an eligible expression referencing the same properties, such as the second expression in TABLE 7, then the properties may be classified as a candidate set, and the process continues to step 212. If the threshold is set to one, then properties may be classified as candidate sets regardless of whether the code is contained in a branch, and steps 206 and 208 may be omitted.

In step 212, the properties of a graph object that are included in an eligible expression are classified as a candidate set of properties. The compiler may store data that uniquely identifies that candidate set as well as data identifying the characteristics of the candidate set. As an example, the compiler may store an index name or value for the candidate set and a reference that identifies each of the two or more properties included in the corresponding candidate set. The compiler may further store information identifying whether the property is used as an input or an output argument.

In step 210, the compiler determines whether there is remaining code to analyze. For example, the compiler may perform steps 202 to 208 for a particular code pattern that was identified through parsing. Once complete, the compiler may determine whether the parser has reached the end of the program code. If there is remaining program code, there may be additional code patterns to analyze, and the process continues to step 202. If there is no remaining code to analyze, then the process continues to step 214.

In step 214, after the compiler has completed searching the input program code for candidate sets of properties, the compiler determines whether the identified candidate sets that are eligible for merging are distinct or not. A candidate set is not distinct if one or more of its properties belongs to multiple candidate sets. This scenario may occur where different expressions that reference the same node or edge property are included in the program code. When a property appears in more than one candidate set, conflicts may arise when trying to access a property if it exists in multiple merged property data structures. To prevent this from occurring, the process may proceed to step 216 if a property belongs to more than one candidate set. If each of the identified candidate sets are distinct, then the process continues to step 218.

In step 216, the compiler selects between non-distinct candidate sets. In order to determine which candidate set to select for merging, the compiler may employ a set of rules and/or filter criteria. The rules and filter criteria may vary from implementation to implementation. In some embodiments, the rules may depend on the target language and/or the target platform on which the code will be executed. In addition or alternatively, the rules may be independent of the target language and target platform. Example rules for selecting between candidate sets may include one or more of the following:

Candidate sets with local properties are given a more favorable weighting for selection than sets that are input or output arguments. Candidate sets that are input or output arguments, when merged, result in the compiler generating additional code that copies the value form the input property to the merged property or from the merged property to the output property, thereby increasing runtime overhead since data is copied form the input arguments into the merged property or from the merged property into output arguments. In addition, memory overhead for candidate sets that have input/output arguments are generally less favorable since input/output arguments are not removed from memory.

Candidate sets that would involve data padding during merging are given a less favorable selection weighting than candidate sets that do not involve data padding during merging. Data padding, as described further below, may be performed by a compiler to avoid performance penalties if the types of the properties that are being merged are different. Data padding increases the memory consumption of the merged property data structure.

Candidate sets that appear more often in the program code are given a more favorable selection weighting than candidate sets that appear less often in the program code. The memory bandwidth and performance may be improved by selecting candidate sets that are likely to be executed more frequently.

Candidate sets that are used in loops that are executed more often than the loops of other candidate sets are given a more favorable selection weighting. For example, a loop that iterates over all nodes in the graph may be assumed to be executed more often than a loop that iterates over the elements in a collection of nodes.

Candidate sets that include a large amount of properties are given a less favorable selection weighting than candidate sets with fewer properties. This rule is used to balance execution performance with memory consumption.

In addition or as an alternative to the rules listed above, the compiler may select between candidate sets based on one or more other rules/filters that indicate which candidate set of properties would consume a greater amount of resources to merge and/or which candidate set of properties has a higher likelihood of being executed more frequently. The compiler may remove candidate sets from eligibility based on the rules and filter criteria. As an example, the compiler may rank the candidate sets based on the rules and remove the lowest ranking candidate sets. As another example, the compiler may apply the filters in a predetermined order until only distinct candidate sets remain. Thus, the manner in which the rules and filters are applied may vary depending on the particular implementation.

In step 218, the compiler merges the properties for each of the remaining eligible candidate sets. During this step, the compiler may instantiate a merged property data structure for each remaining candidate set and modify the program code to use the instantiated merged property data structure. Examples of code additions and modifications are given in further detail in the sections below.

Generating Merged Property Data Structures

For each set of properties that is selected for merging, the compiler generates program code for a merged property data structure, such as described in step 104 of FIG. 1. The program code that is generated causes a computing device executing the program to store the properties that belong to the merged property data structure consecutively in memory. As an example, for the program code depicted in TABLE 4, a merged property data structure may be generated to store the node properties "bar1" and "bar2" contiguously in memory. TABLE 5 below depicts example program code for generating the merged property data structure.

TABLE 8

SAMPLE MERGED PROPERTY DATA STRUCTURE

```
struct temp_property {
    int bar1
    int bar2
}
```

Although only two properties are depicted in TABLE 5, a merged property data structure may store more than two properties.

The format of the program code may vary depending on the target language and target platform on which the program is executed. In some embodiments, the compiler generates code for the following:

Type generation: For each merged property data structure, a new data type may be generated, which may be derived from the data types of the properties that are merged. For example, if the original properties had type double and type integer, then the generated type may be a composite type that contains a double and integer type. The compiler may also generate code through which the individual property values may be accessed. Depending on the target language and the types of the properties that are being merged, data padding may be calculated and generated for the new type. For instance a property may have data padding added to prevent the value from crossing multiple cache lines.

Variable declaration: For each merged property, the compiler declares a new variable. The type of this variable is a property of the type generated by the compiler for the corresponding merged property data structure.

Data initialization: If one of the original properties included in a candidate set was an input argument to the program, then the data of the merged property data structure may be initialized with the original values of the property. The compiler may generate code that copies the data from the original property to the correspondent field in the merged property.

In some embodiments, the merged property data structure is temporary in nature. That program code that is added by the compiler may generate a temporary structure to hold the properties in consecutive memory locations. During execution of the program, data structure is generated within memory, allowing the processor to access the values from the consecutive memory locations/addresses. In some instances, multiple properties may be read by the processor from the same cache line. After execution of the code, the temporary merged data structure may be removed from memory without persisting the data structure. To prevent loss of data, code for copying back values to the original properties may be added as described further below.

Figure 3:
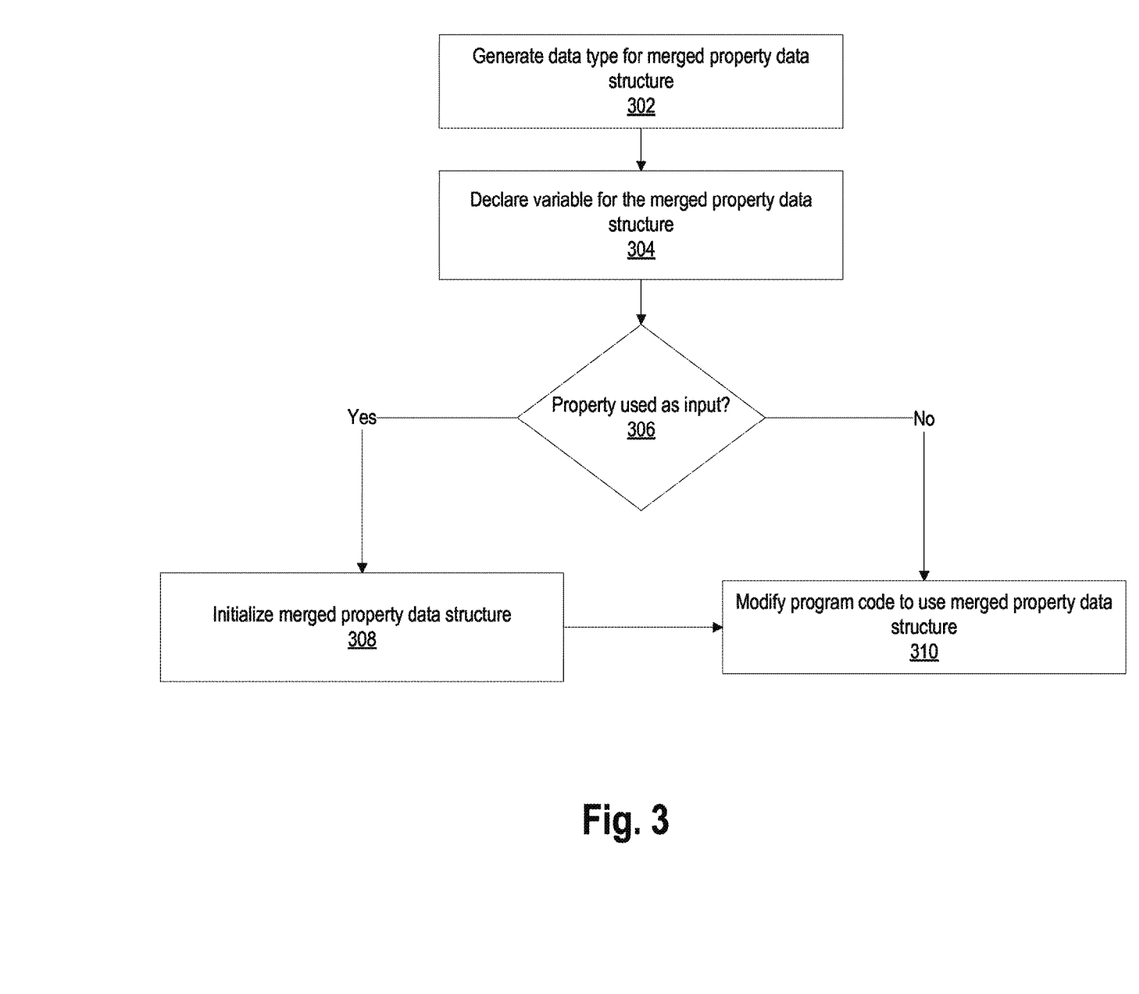
FIG. 3 depicts an example process for generating a merged property data structure.

FIG. 3 depicts an example process for generating a merged property data structure, according to an embodiment. In step 302, the compiler generates a new data type for the merged property data structure. The compiler may derive the new data type based on the underlying data types of the properties that belong to the candidate set. For example, the merged property data structure depicted in TABLE 8 has a composite type that contains two "int" types. The number, ordering, and data types of the merged properties may vary, and the derived data types may be different between different merged property data structures. The compiler may organize and reorder the internal layout of the generated type to optimize the memory layout of graph properties that belong to the merged property data structure.

In step 304, the compiler declares a variable for the merged property data structure. The variable that is declared is a node or property of the new data type generated in the previous step and may be used when rewriting the code as described further below. Any variable that uniquely identifies an instance of the merged property data structure may be used by the compiler.

In step 306, the compiler determines if any of the properties that belong to the merged property data structure are used as input. To make this determination, the compiler may parse the program code to search for instances of the property that are used as input arguments. If the compiler finds an instance that is used as an input argument, then the process continues to step 308. Otherwise, the process continues to step 310.

In step 308, the compiler initializes the merged property data structure. For each property used as an input argument that belongs to the merged property data structure, the compiler generates program code that copies the input value of the original property to the corresponding field in the merged property data structure. As an example, if "bar2" is used as an input value, then the compiler may generate program code to copy the value of bar2 into the data structure depicted in TABLE 8.

In step 310, the program is modified to use the merged property data structure. Techniques for modifying program code are described in further detail in the section below.

Rewriting Code to Leverage Merged Property Data Structures

Once program code is added for a merged property data structure, the compiler may modify the input program code to make use of the merged property data structure. Example modifications include Copy-Back: If one of the original properties was used as output of the program, then the compiler generates code that copies back the value of the correspondent field in the merged property to the original property before the program returns.

Read rewriting: The compiler replaces each read-access to the original property by a read-access to the correspondent field in the merged property.

Write rewriting: The compiler replaces each write-access to the original property by a write-access to the correspondent field in the merged property.

Removal of unused properties: If the compiler finds unused properties, the compiler may remove them from the program.

Figure 4:
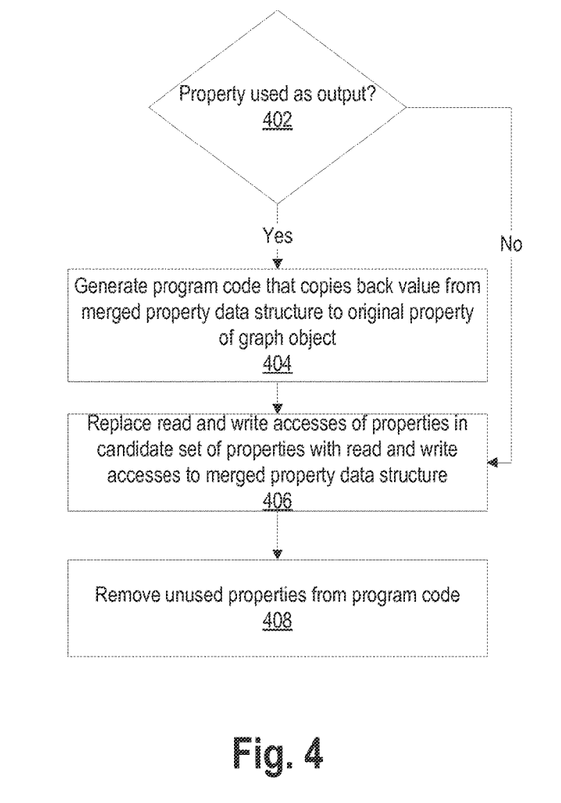
FIG. 4 depicts an example process for modifying program code to use a merged property data structure.

FIG. 4 depicts an example process for modifying program code to use a merged property data structure, according to an embodiment. In step 402, the compiler determines whether a property that belongs to a merged property data structure is used as an output. To make this determination, the compiler may parse the input program code to search for instances of the original property that are used as output arguments. If an instance is found, then the process continues to step 404. Otherwise, the process continues to step 406.

In step 404, for each property that belongs to the merged property data structure and that is used as an output, the compiler generates program code that copies back the value from the merged property data structure to the original property of the graph object. This code may be generated by the compiler at every exit point of the procedure such as when the procedure reaches the last statement or encounters a return statement. As an example, if "bar1" is used as an output argument in the program code, then the compiler may copy back the value from the corresponding field of the "temp_property" data structure, depicted in TABLE 8 above, to the original node "bar1" for every exit point in a graph analysis procedure.

In step 406, the compiler replaces read and write accesses of the original properties that were merged with read and write accesses to the merged property data structure. As an example, reads and writes of the property "bar1" may be respectively replaced with reads and writes of the "bar1" field in the "temp_property" data structure defined in TABLE 8. Similarly, reads and writes of the original property "bar2" may be respectively replaced with reads and writes of the "bar2" field of the same data structure.

After the above modifications, some of the original, local properties that belong to the merged property data structure may be unused. This scenario may occur if all reads and writes for the original property have been replaced. In step 408, the compiler removes such unused properties from the program code. To perform this step, the compiler may analyze the modified program code to search for properties that have no remaining reads or writes. If the compiler finds a property with no remaining reads or writes, the compiler removes them from the program.

TABLE 9 below depicts an example Green-Marl program to which the property merging optimization may be applied.

TABLE 9

SAMPLE INPUT PROGRAM CODE

```
1   procedure pagerank(
2       G: graph, e,d: double, max: int; //input arguments
3       rank: nodeProperty<double>) { //output arguments
4       ...
5       double N = ...;
6       nodeProperty<int> degree; //local property
7       for(n: G.nodes) {
8         n.rank = 1 / N;
9         n.degree = n.outDegree( );
10      }
11      do {
12        ...
13        foreach(t: G.nodes) {
14          double val = ... * sum(w: t.inNbrs)
15                       {w.rank / w.degree};
16          ...
17        }
18      } while(...);
19   }
```

In response to receiving the code depicted in TABLE 9 as input, a compiler may parse the program code to identify the properties rank and degree. The compiler may classify these properties as a candidate set for merging and note that the rank property is used as an ouptut argument. Using the heuristic described above, the compiler may determine that merging rank and degree will be beneficial.

Once the compiler determines to merge the rank and degree properties, the compiler modifies the program code to add and use a corresponding merged property data structure. TABLE 10 below depicts an example result of such modification.

TABLE 10

SAMPLE INPUT PROGRAM CODE

```
1    type merged_type {
2        double rank;
3        int degree;
4    }
5
6    procedure pagerank(
7                G: graph, e,d: double, max: int; //input arguments
8                rank: nodeProperty<double>) { //output arguments
9        ...
10       double N = ...;
11       nodeProperty<double> degree; //local property
12       nodeProperty<merged_type> merged_property;
13       for(n: G.nodes) {
14           n.merged_property.rank = 1 / N;
15           n.merged_property.degree = 1 / n.outDegree( );
16       }
17       do {
18           ...
19           foreach(t: G.nodes) {
20               double val = ... * sum(w: t.inNbrs)
21                       {w.merged_property.rank /
                         w.merged_property.degree};
22               ...
23           }
24       } while(...);
25       for(n: G.nodes) {
26           n.rank = n.merged_property.rank;
27       }
28   }
```

With reference to TABLE 10, the compiler adds code to declare a new type merged_type (line 1-4) that is used to declare a new node property variable (line 12). All reads and writes to rank and degree have been rewritten to use the new merged property (lines 14, 15 and 21). At the end of the procedure, code has been added to write back the values from the merged property to the rank property. This code is added since rank is an output argument. The compiler does not add such code for degree since it is a local property so it is not visible outside the algorithm.

After the compiler has made the modifications depicted in TABLE 10, the compiler may then search for and remove unused properties. TABLE 11 below depicts an example result of removing such properties.

TABLE 11

SAMPLE REMOVAL OF UNUSED PROPERTIES

```
1    type merged_type {
2        double rank;
3        int degree;
4    }
5
6    procedure pagerank(
7                G: graph, e,d: double, max: int; //input arguments
8                rank: nodeProperty<double>) { //output arguments
9        ...
10       double N = ...;
11       nodeProperty<double> degree; //local property
12       nodeProperty<merged_type> merged_property;
13       for(n: G.nodes) {
14           n.merged_property.rank = 1 / N;
15           n.merged_property.degree = 1 / n.outDegree( );
16       }
17       do {
18           ...
19           foreach(t: G.nodes) {
20               double val = ... * sum(w: t.inNbrs)
21                       {w.merged_property.rank /
                         w.merged_property.degree};
22               ...
23           }
```

(Line 11 is shown with strikethrough: ~~nodeProperty<double> degree; //local property~~)

TABLE 11-continued

SAMPLE REMOVAL OF UNUSED PROPERTIES

```
24       } while(...);
25       for(n: G.nodes) {
26           n.rank = n.merged_property.rank;
27       }
28   }
```

With reference to TABLE 11, the degree property is removed since all reads and writes of this property have been replaced with the merged property data structure. Thus, line 11 of the program code, which contains a declaration for the degree property, is removed from the program code. The rank property is not removed since it is an input argument.

Once the compiler is done modifying the program code, the compiler may compile the code into an equivalent executable binary. In addition or alternatively, the compiler may translate the code into an equivalent program in a different programming language. As an example, a DSL compiler may translate DSL code into a general programming language (referred to herein as a "target" language). Translation allows optimizations provided by a DSL compiler to be integrated with optimizations provided by general programming language compilers. The implementation of the newly declared type may be performed based on the target language that is being generated. For example when generating C++ code, a "struct" data structure might be generated to realize the type. Different structures and semantics might be used when translating to other languages. In addition, the compiler may reorder the internal layout of the newly generated type and add data padding based on the target language. The reordering may be performed to prevent suboptimal data layouts which might affect the performance of the application, such as preventing a single property from being split across separate cache lines.

When an executable is generated from the modified code, a computing device executing the code loads the merged properties into consecutive memory locations. In the example code depicted in TABLE 11, for instance, the values for degree and rank are stored consecutively, although the order of the properties may vary depending on the particular implementation. The processor may access these node properties from the consecutive memory locations even though the original properties may not have sequential in the originally defined node and there may be many other properties associated with the same node. At the end of execution, the values in memory for the rank field of the merged property data structure are copied back to the memory location for the original rank property.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

The term "logic" as used herein includes computer or electrical hardware component(s), firmware, a non-transitory computer readable medium that stores instructions, and/or combinations of these components configured to perform one or more functions or actions, and/or to cause one or more functions or actions from another logic, method, and/or system. Logic may include a microprocessor controlled by executable code, a discreet logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logic units are described, it may be possible to incorporate the multiple logic units into one physical logic component. Similarly, where a single logic unit is described, it may be possible to distribute the single logic unit between multiple physical logic components.

Figure 5:
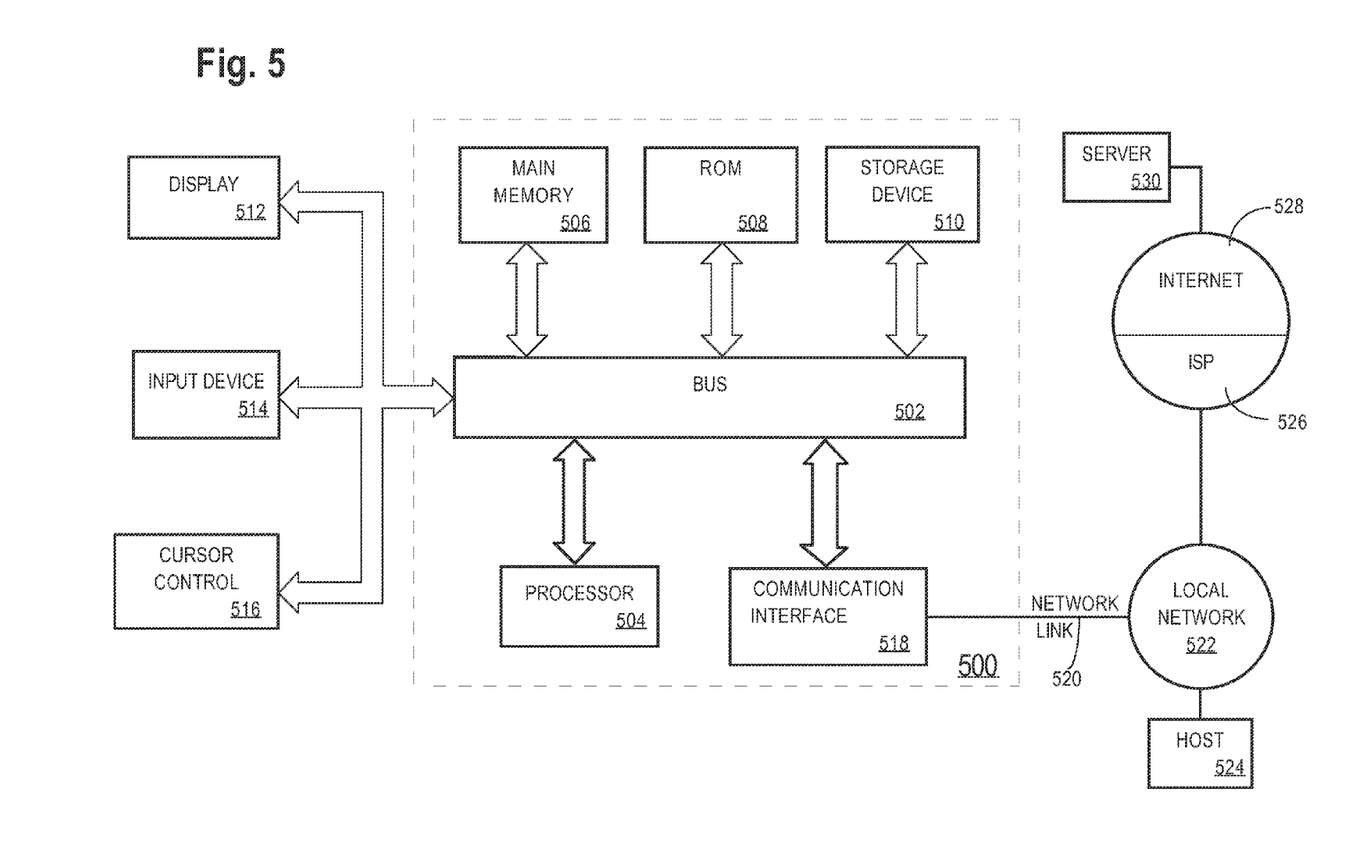
FIG. 5 depicts an example computer system upon which some embodiments may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   identifying, from a plurality of properties of a particular data object that are referenced by program code of a procedure, one or more candidate sets of properties that are eligible for merging;
   searching, by a compiler executing on a computing device, within the program code for one or more expressions, wherein each expression of the one or more expressions reads different properties of the particular data object that belong to a same candidate set of properties of the one or more candidate sets of properties;
   for particular different properties of a particular candidate set of properties of the one or more candidate sets of properties, determining based on the searching, whether to merge the particular different properties;
   after determining to merge the particular different properties, generating, within memory of the computing device, a particular data structure for storing the particular different properties consecutively in memory;
   determining whether a particular property of the particular different properties is an output for said program code of said procedure; and
   in response to determining that the particular property of the particular different properties is the output for said program code of said procedure, generating, by the compiler executing on the computing device, additional program code for copying a value from the particular data structure to the particular property.

2. The method of claim 1, wherein searching for the one or more expressions comprises searching for at least one nested expression, wherein each nested expression of the at least one nested expression references multiple properties of the particular data object.

3. The method of claim 2 wherein the at least one nested expressions include nested loops that reference multiple properties of the particular data object.

4. The method of claim 1,
   wherein said program code of said procedure includes a particular expression that includes a first property and a second property of the plurality of properties;
   wherein the method further includes the compiler determining, based on a code pattern that includes the particular expression, that the first property and the second property should not be identified as a candidate set of properties of the one or more candidate sets of properties.

5. The method of claim 1 wherein generating the particular data structure for storing the particular different properties of the particular data object comprises generating padding to prevent a particular property of the particular different properties from being split across two cache lines.

6. A method comprising:
   identifying, from a plurality of properties of a particular data object that are referenced by program code, one or more candidate sets of properties that are eligible for merging;
   for a respective candidate set of properties of the one or more candidate sets of properties, determining whether to merge different properties of the particular data object that belong to the respective candidate set of properties;
   after determining to merge the different properties of the particular data object that belong to the respective candidate set of properties, generating, within memory of a computing device, a particular data structure for storing the different properties of the particular data object that belong to the respective candidate set of properties consecutively in memory;
   wherein determining whether to merge different properties of the particular data object that belong to the respective candidate set of properties comprises:
      determining whether at least one of the different properties of the particular data object that belong to the respective candidate set of properties also belongs to at least one other candidate set of properties of the one or more candidate sets of properties;
      if the at least one of the different properties of the particular data object that belong to the respective candidate set of properties also belongs to the at least one other candidate set of properties of the one or more candidate sets of properties, then selecting between the respective candidate set of properties and the at least one other candidate set of properties; and
      in response to selecting the respective candidate set of properties, removing the at least one other candidate set of properties from eligibility for merging.

7. The method of claim 6, wherein selecting between the respective candidate set of properties and the at least one other candidate set of properties is performed based on which would consume a greater amount of resources to merge.

8. The method of claim 6, wherein selecting between the respective candidate set of properties and the at least one other candidate set of properties is performed based on which has a higher likelihood of being executed more frequently.

9. The method of claim 6, wherein generating, within memory of the computing device, the particular data structure for storing the different properties of the particular object that belong to the respective candidate set of properties consecutively in memory comprises:

generating, by a compiler executing on the computing device, additional program code for copying values of the different properties into the particular data structure.

10. The method of claim 6, further comprising:
rewriting the program code by replacing references to the different properties of the particular object that belong to the respective candidate set of properties with references to the particular data structure.

11. One or more non-transitory storage media storing instructions which, when executed by one or more computing devices, cause:
identifying, from a plurality of properties of a particular data object that are referenced by program code of a procedure, one or more candidate sets of properties that are eligible for merging;
searching, by a compiler executing on a computing device, within the program code for one or more expressions, wherein each expression of the one or more expressions reads different properties of the particular data object that belong to a same candidate set of properties of the one or more candidate sets of properties;
for particular different properties of a particular candidate set of properties of the one or more candidate sets of properties, determining based on the searching, whether to merge the particular different properties;
after determining to merge the particular different properties, generating, within memory of the computing device, a particular data structure for storing the particular different properties consecutively in memory;
determining whether a particular property of the particular different properties is an output for said program code of said procedure; and
in response to determining that the particular property of the particular different properties is the output for said program code of said procedure, generating, by the compiler executing on the computing device, additional program code for copying a value from the particular data structure to the particular property.

12. The one or more non-transitory storage media of claim 11, wherein searching for the one or more expressions comprises searching for at least one nested expression, wherein each nested expression of the at least one nested expression references multiple properties of the particular data object.

13. The one or more non-transitory storage media of claim 12 wherein the at least one nested expressions include nested loops that reference multiple properties of the particular data object.

14. The one or more non-transitory storage media of claim 11,
wherein said program code of said procedure includes a particular expression that includes a first property and a second property of the plurality of properties;
wherein the instructions include instructions that, when executed by the one or more computing devices, cause the compiler
determining, based on a code pattern that includes the particular expression, that the first property and the second property should not be identified as a candidate set of properties of the one or more candidate sets of properties.

15. The one or more non-transitory storage media of claim 11 wherein generating the particular data structure for storing the particular different properties of the particular data object comprises generating padding to prevent a particular property of the particular different properties from being split across two cache lines.

16. One or more non-transitory storage media storing instructions which, when executed by one or more computing devices, cause:
identifying, from a plurality of properties of a particular data object that are referenced by program code, one or more candidate sets of properties that are eligible for merging;
for a respective candidate set of properties of the one or more candidate sets of properties, determining whether to merge different properties of the particular data object that belong to the respective candidate set of properties;
after determining to merge the different properties of the particular data object that belong to the respective candidate set of properties, generating, within memory of a computing device, a particular data structure for storing the different properties of the particular data object that belong to the respective candidate set of properties consecutively in memory;
wherein determining whether to merge different properties of the particular data object that belong to the respective candidate set of properties comprises:
determining whether at least one of the different properties of the particular data object that belong to the respective candidate set of properties also belongs to at least one other candidate set of properties of the one or more candidate sets of properties;
if the at least one of the different properties of the particular data object that belong to the respective candidate set of properties also belongs to the at least one other candidate set of properties of the one or more candidate sets of properties, then selecting between the respective candidate set of properties and the at least one other candidate set of properties; and
in response to selecting the respective candidate set of properties, removing the at least one other candidate set of properties from eligibility for merging.

17. The one or more non-transitory storage media of claim 16, wherein selecting between the respective candidate set of properties and the at least one other candidate set of properties is performed based on which would consume a greater amount of resources to merge.

18. The one or more non-transitory storage media of claim 16, wherein selecting between the respective candidate set of properties and the at least one other candidate set of properties is performed based on which has a higher likelihood of being executed more frequently.

19. The one or more non-transitory storage media of claim 16, wherein generating, within memory of the computing device, the particular data structure for storing the different properties of the particular object that belong to the respective candidate set of properties consecutively in memory comprises:
generating, by a compiler executing on the computing device, additional program code for copying values of the different properties into the particular data structure.

20. The one or more non-transitory storage media of claim 11, wherein the instructions further cause:

rewriting the program code by replacing references to the different properties of the particular object that belong to the respective candidate set of properties with references to the particular data structure.

* * * * *

UNITED STATES PATENT AND TRADEMARK OFFICE
CERTIFICATE OF CORRECTION

| | |
|---|---|
| PATENT NO. | : 10,127,025 B2 |
| APPLICATION NO. | : 14/805897 |
| DATED | : November 13, 2018 |
| INVENTOR(S) | : Martin Sevenich et al. |

It is certified that error appears in the above-identified patent and that said Letters Patent is hereby corrected as shown below:

In the Specification

In Column 12, Line 60, delete "ouptut" and insert -- output --, therefor.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*